US011936995B2

(12) United States Patent
Berner et al.

(10) Patent No.: US 11,936,995 B2
(45) Date of Patent: *Mar. 19, 2024

(54) EVENT-BASED VISION SENSOR WITH DIRECT MEMORY CONTROL

(71) Applicant: Sony Advanced Visual Sensing AG, Schlieren (CH)

(72) Inventors: Raphael Berner, Confignon (CH); Christian Brandli, Baden (CH); Massimo Zannoni, Zurich (CH)

(73) Assignee: Sony Advanced Visual Sensing AG, Schlieren (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/541,559

(22) Filed: Dec. 3, 2021

(65) Prior Publication Data

US 2022/0094863 A1 Mar. 24, 2022

Related U.S. Application Data

(63) Continuation of application No. 16/297,273, filed on Mar. 8, 2019, now Pat. No. 11,212,468.

(Continued)

(51) Int. Cl.
*H04N 25/50* (2023.01)
*H04N 25/44* (2023.01)
(Continued)

(52) U.S. Cl.
CPC ............. *H04N 25/50* (2023.01); *H04N 25/44* (2023.01); *H04N 25/745* (2023.01);
(Continued)

(58) Field of Classification Search
CPC ...... H04N 5/351; H04N 5/345; H04N 5/3745; H04N 5/37452; H04N 5/3765;
(Continued)

(56) References Cited

U.S. PATENT DOCUMENTS 6,253,161 B1 6/2001 Arias-Estrada
7,728,269 B2 6/2010 Lichtsteiner et al.
(Continued)

FOREIGN PATENT DOCUMENTS

JP 2002118822 A 4/2002
KR 20160058449 A 5/2016
(Continued)

OTHER PUBLICATIONS

International Search Report and Written Opinion of the International Searching Authority, dated Jun. 6, 2019, from International Application No. PCT/IB2019/051921, filed on Mar. 8, 2019. 15 pages.

(Continued)

*Primary Examiner* — Abdelaaziz Tissire
(74) *Attorney, Agent, or Firm* — HoustonHogle LLP

(57) ABSTRACT

An event-based vision sensor system comprises an event-based pixel array including pixels that detect light, a readout circuit for reading out events associated with light received by each pixel and with the position it occupies in the array, and a memory controller that enables writing of each event, or event-related data, associated with a certain pixel to a certain address in a memory.

19 Claims, 15 Drawing Sheets

Related U.S. Application Data

(60) Provisional application No. 62/642,842, filed on Mar. 14, 2018.

(51) Int. Cl.
   *H04N 25/71*       (2023.01)
   *H04N 25/75*       (2023.01)
   *H04N 25/77*       (2023.01)
   *H04N 25/771*      (2023.01)
   *H04N 25/79*       (2023.01)

(52) U.S. Cl.
   CPC .............. *H04N 25/75* (2023.01); *H04N 25/77* (2023.01); *H04N 25/771* (2023.01); *H04N 25/79* (2023.01)

(58) Field of Classification Search
   CPC ........ H04N 5/378; H04N 5/379; H04N 25/50; H04N 25/44; H04N 25/745; H04N 25/75; H04N 25/77; H04N 25/771; H04N 25/07
   See application file for complete search history.

(56) References Cited

U.S. PATENT DOCUMENTS

| | | | |
|---|---|---|---|
| 9,521,337 | B1 | 12/2016 | Shen et al. |
| 11,212,468 | B2* | 12/2021 | Berner .................. H04N 5/3765 |
| 2001/0040633 | A1 | 11/2001 | Yang |
| 2003/0081134 | A1 | 5/2003 | Luo et al. |
| 2007/0211156 | A1* | 9/2007 | Tay .................... H04N 1/32475 |
| | | | 348/E9.037 |
| 2008/0284888 | A1* | 11/2008 | Kobayashi ............. H04N 25/76 |
| | | | 348/E3.018 |
| 2010/0182468 | A1 | 7/2010 | Posch et al. |
| 2013/0335595 | A1 | 12/2013 | Lee et al. |
| 2014/0077063 | A1* | 3/2014 | Cho .................. H01L 27/14618 |
| | | | 257/443 |
| 2015/0116564 | A1* | 4/2015 | Williams ............. H04N 25/772 |
| | | | 348/308 |
| 2015/0281613 | A1 | 10/2015 | Vogelsang et al. |
| 2015/0302710 | A1 | 10/2015 | Jin et al. |
| 2016/0109955 | A1 | 4/2016 | Park et al. |
| 2016/0187196 | A1* | 6/2016 | Kim ........................ G06F 3/017 |
| | | | 250/206.1 |
| 2016/0320834 | A1 | 11/2016 | Lee et al. |
| 2017/0011006 | A1 | 1/2017 | Saber et al. |
| 2017/0059399 | A1 | 3/2017 | Suh et al. |
| 2017/0168521 | A1 | 6/2017 | Suh et al. |
| 2018/0039601 | A1 | 2/2018 | Park et al. |
| 2018/0059805 | A1 | 3/2018 | Suh et al. |
| 2018/0191972 | A1 | 7/2018 | Berner et al. |
| 2018/0262705 | A1* | 9/2018 | Park ........................ H04N 25/79 |
| 2019/0075271 | A1* | 3/2019 | Orfaig .................... H04N 5/378 |

FOREIGN PATENT DOCUMENTS

| | | |
|---|---|---|
| WO | WO2017013806 | 1/2017 |
| WO | WO 2017149433 A1 | 9/2017 |
| WO | WO2018122798 | 7/2018 |

OTHER PUBLICATIONS

Posch, C., et al., "An Asynchronous Time-Based Image Sensor," IEEE, 2130-2133 (2008).

Wu, N., "Neuropmorphic Vision Chips," Science China, 61: 060421:1-0604217 (2018).

International Preliminary Report on Patentability, dated Sep. 24, 2020, from International Application No. PCT/IB2019/051921, filed on Mar. 8, 2019. 8 pages.

* cited by examiner

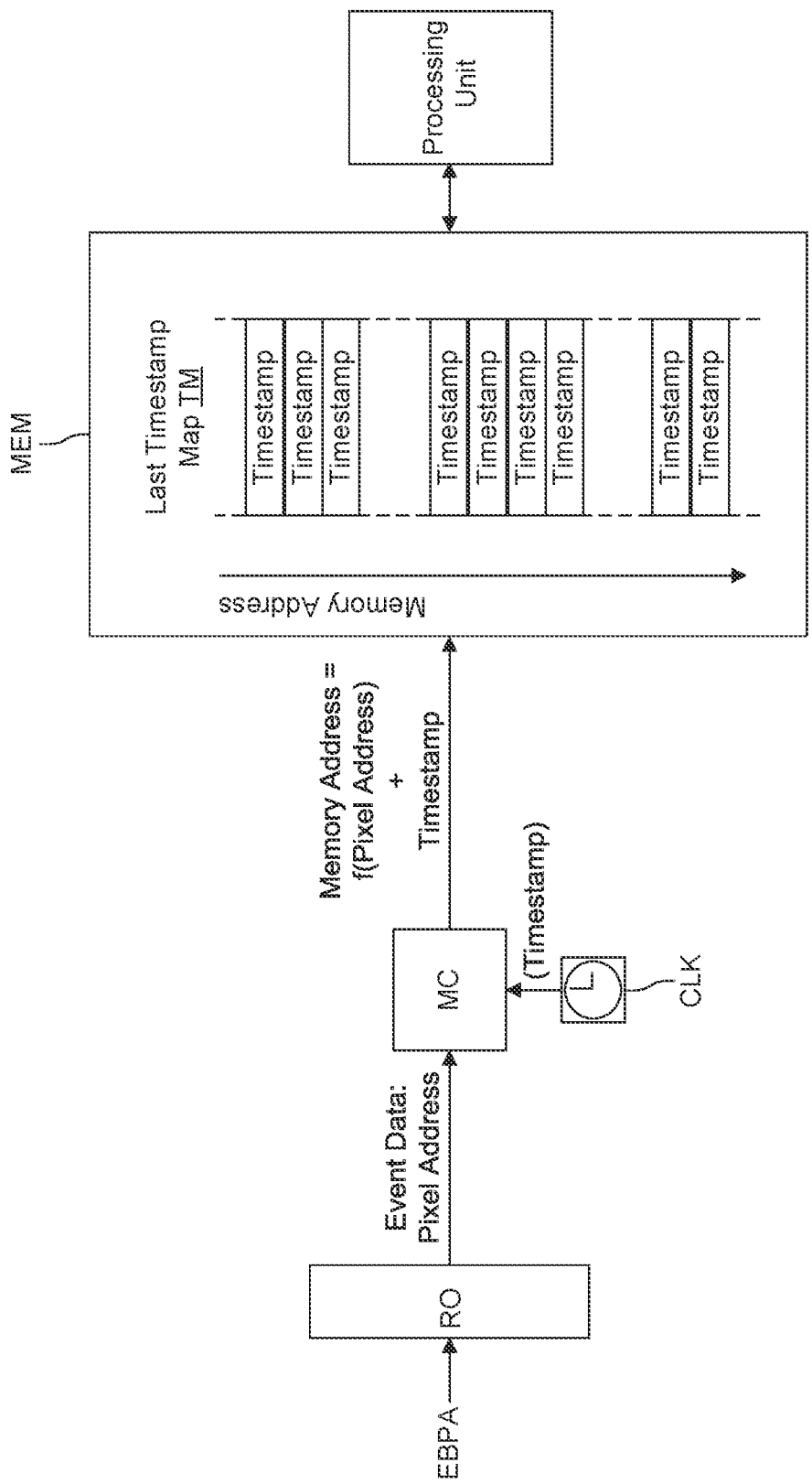

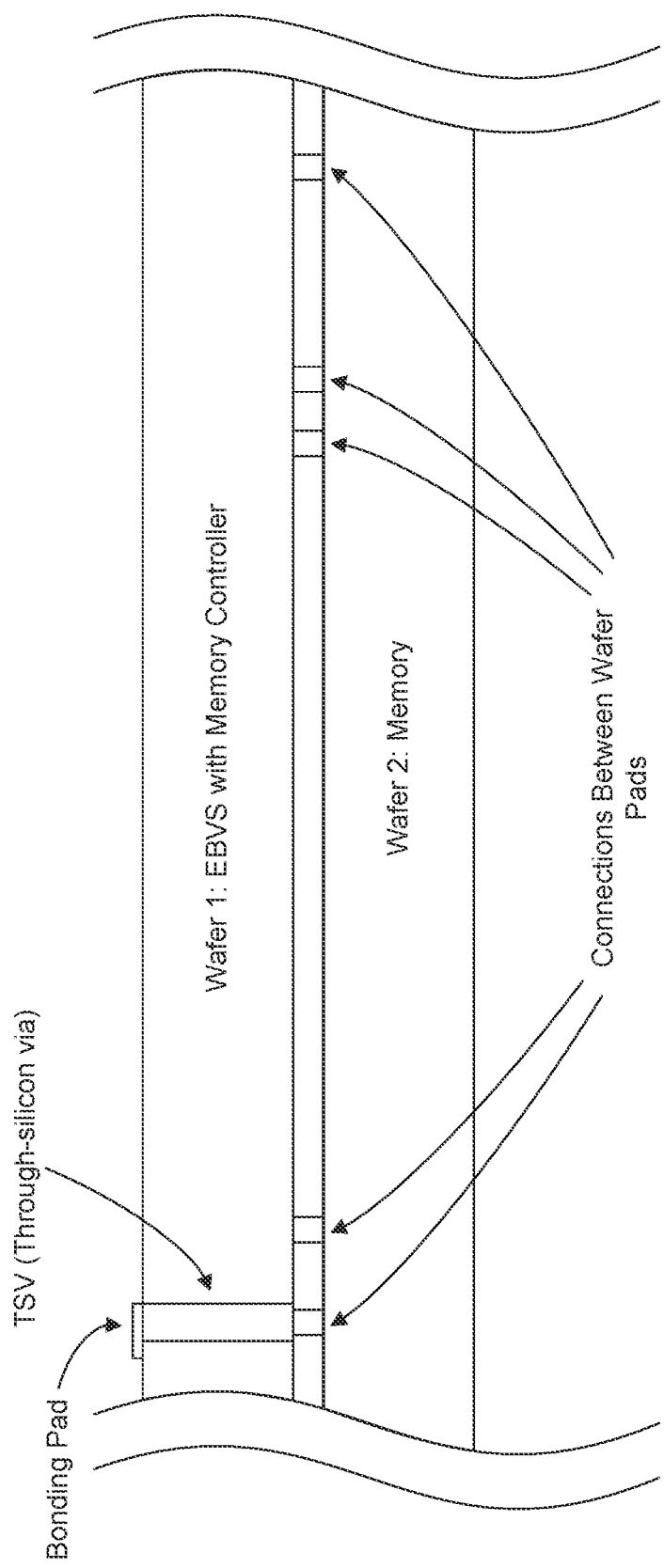

EVENT-BASED VISION SENSOR WITH DIRECT MEMORY CONTROL

RELATED APPLICATIONS

This application is a Continuation of U.S. patent application Ser. No. 16/297,273, filed on Mar. 8, 2019, which claims the benefit under 35 USC 119(e) of U.S. Provisional Application No. 62/642,842, filed on Mar. 14, 2018, which are incorporated herein by reference in their entirety.

BACKGROUND OF THE INVENTION

A critical figure of merit of machine vision systems is the latency, which is the time that passes between the moment the light is received and the moment the data elaboration delivers its results.

Event-based vision sensors offer many advantages for machine vision application, mainly by intrinsically compressing the data stream and thus reducing the amount of data elaboration that a processing unit connected to the sensor needs to perform.

A key aspect of the current state-of-the-art is that the processing unit that is connected to the sensors has not only the task of elaborating the event-related data received from the sensors, but also, as first step, of receiving the data stream, eventually converting it, and saving it to a memory.

SUMMARY OF THE INVENTION

The proposed invention embeds this task in the sensor, relieving the processing unit from the task of receiving the data and maintains them in the memory that is then used to perform the elaboration.

A key requirement of systems comprising event-based vision sensor is low latency. Today's solutions need to use part of the calculation bandwidth of the processing unit that takes care of elaborating the data from the sensor, to write and maintain the content of the memory that stores the data generated by the sensor. Enabling the sensor to directly write and update the content of the memory, reduces latency, power consumption and computational resources by relieving the processing unit from the task of interpreting the data before relaying it to the memory. By maintaining a memory map that contains the last timestamp any pixel has created an event, basic computations such as the computation of normal flow can be significantly accelerated.

In general, according to one aspect, the invention features an event-based vision sensor system, comprising an event-based pixel array including pixels that detect light, a readout circuit for reading out events associated with light received by each pixel and with the position it occupies in the array, and a memory controller that enables writing of each event, or event-related data, associated with a certain pixel to a certain address in a memory.

In an embodiment, the memory controller ensures that the position of that address in the memory in which that event or event-related data is written, is a function of the position in the pixel array occupied by the pixel that generated that event. Preferably, the memory can be written by the memory controller and independently read from outside.

The system might even be implemented as three-dimensional integrated circuit.

Typically, the memory controller implements a one-to-one mapping between pixels of the event-based pixel array and addresses in the memory.

Often, the memory controller is on the same chip as the event-based pixel array.

In some examples, the memory controller stores timestamps in the memory and also possibly maintains a buffer index in the memory for last time stamp map also stored in the memory.

In operation, the memory controller sends timestamps followed by addresses of pixels that detected a change to the memory.

In general, according to another aspect, the invention features a method of operation of an event-based vision sensor system. The method comprises detecting light with an event-based pixel array, reading out events associated with light received by each pixel and with the position it occupies in the array with a readout circuit, and a memory controller writing of each event, or event-related data, associated with each pixel to different address in a memory.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 6A: Example of implementation that writes to the memory the "last timestamp map", in which FIG. 6A shows an embodiment used for this implementation (the clock source can be internal or external to the sensor).

FIG. 8A: Embodiment to show a three-dimensional integrated circuit (3D IC) application: a vertical section of a portion of the stacked wafers is shown. Here, a process where two wafers are stacked together is shown: one wafer is used to implement the event-based image sensor, the other is a memory IC; the two wafers stacked together form a three-dimensional integrated circuit.

DETAILED DESCRIPTION OF THE PREFERRED EMBODIMENTS

Figure 1:
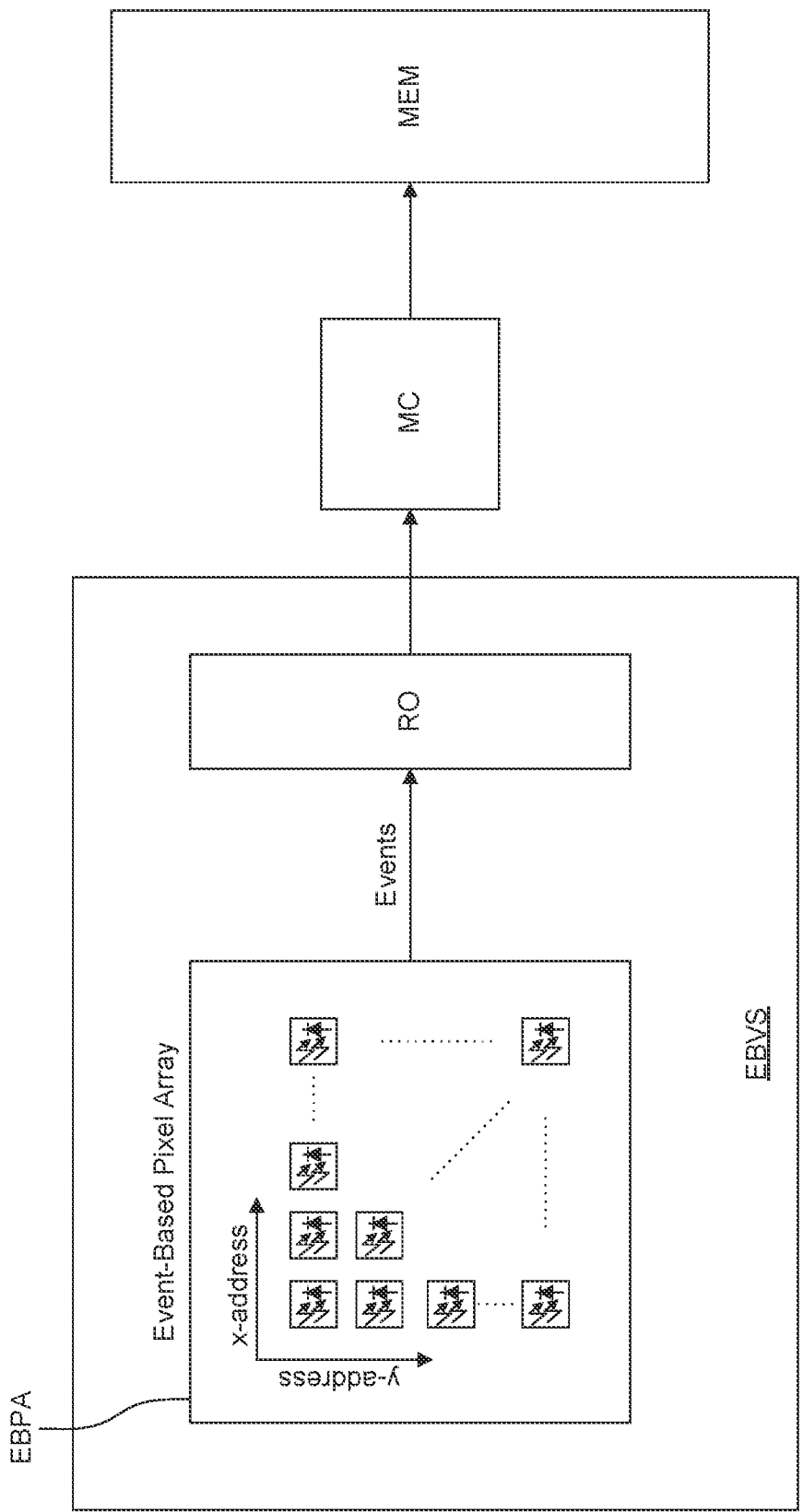
FIG. 1: State-of-the-art event-based image sensor: here it is shown the current typical implementation of an event-based image sensor; the sensor generates data (events) from the light detection pixel array and transmits this data outside; typically, the processing unit that receives and saves the data is also the same that performs the elaboration on the same data.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Definitions

An Event-Based Pixel Array (EBPA) is an array of pixels containing photo-sensitive devices and pixel circuits that take as input the output signal of the photo-sensitive devices; these pixels (combining photosensitive devices and pixel circuits), spatially and/or temporally independently from each other, generate discretized data as function of the light radiation by which they are hit.

An Event-Based Vision Sensor (EBVS) is a sensor that outputs data extracted and/or elaborated from an EBPA.

The System Latency is defined as the time between a light change and the output of the data elaboration.

Read-out Circuit (RO): circuitry that extract events (or event data) from an EBPA.

Memory Controller (MC): circuitry that writes data to a memory, having the capability of selecting a specific address of the memory, to which a specific data is written.

Pixel Address (k): number, or list of numbers, that represents the position of a pixel in a pixel array.

Memory Address (m): number, or list of numbers, that represent a location in a memory and that can be used to access that location of the memory for reading or writing data.

State-of-the-Art

As shown in FIG. 1, a state-of-the-art for event-based vision sensor EBVS has an event-based pixel array EBPA and a read-out circuitry RO that reads the events generated by the array EBPA and outputs them to the external processing unit, in the form of an event data stream. This data stream is typically received by a processing unit (e.g. CPU, microcontroller, digital signal processor (DSP)) that is saving this data in a memory, which will then be accessed to perform data elaboration, typically by the same processing unit that received the data in the first place. Often, the event data received from the sensor has to be elaborated by the processing unit before being saved to the memory, to convert it to a format compatible with the memory or with the subsequent elaboration steps.

Figure 2:
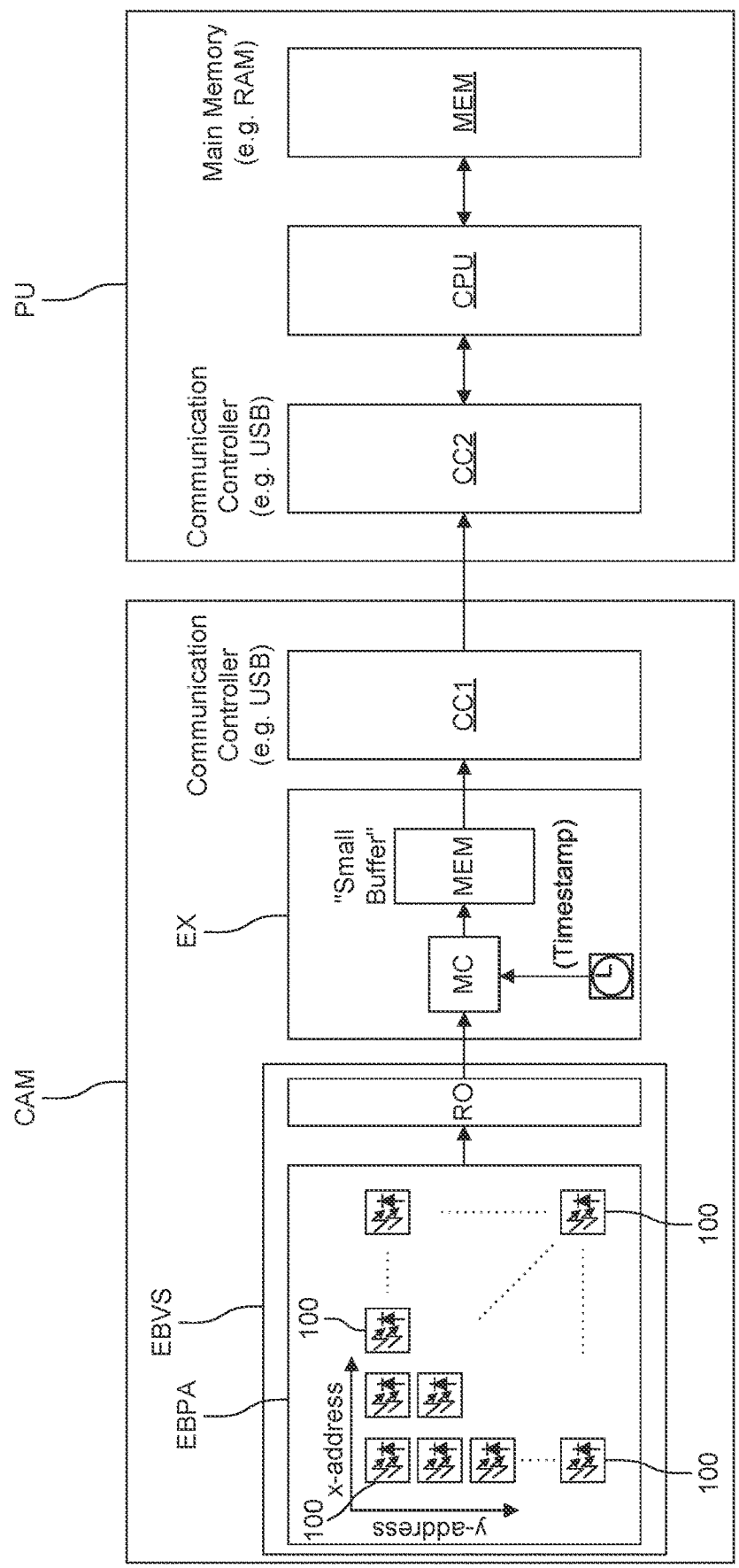
FIG. 2: Example of current state-of-the-art: implementation for a DVS type of sensor, used with a PC that functions as the processing unit.

An implementation of this approach is shown in FIG. 2. The event-based pixel array EBPA comprises a two dimensional array of event-based change detection sensors or pixels 100 (such as proposed in PCT/IB2017/058526 or U.S. Pat. No. 7,728,269B2 or and U.S. Pub. No. 2018/0191972); it generates event data, in the form of the addresses of the pixels 100 that detected a light change. (An exemplary pixel architecture is provided below in connection with the description of FIG. 10.) Each of these addresses encodes the position of a pixel in the array, in the form of two numbers representing x-y coordinates. This data is then collected by an external device EX, typically a field programmable gate array (FPGA), complex programmable logic device (CPLD) or a DSP, that stores the event data in a buffer memory, and then the event data is sent to the processing device PU (e.g. a personal computer (PC)), by a communication controller CC1 on-board the camera CAM. On the processing side, the data that was sent through the communication channel (e.g. USB) is received by a second communication controller CC2. The central processing unit CPU of the processing unit PU handles the transport of the data to the memory MEM of the processing unit, as well as a subsequent data elaboration.

One of the main sources of System Latency in this approach is given by the fact that the event data stream has to be received, decoded and stored before the data elaboration, typically by the same device that will then elaborate the data. The latency here is defined as the time between the detection of the light change and the output of the data elaboration.

Figure 3:
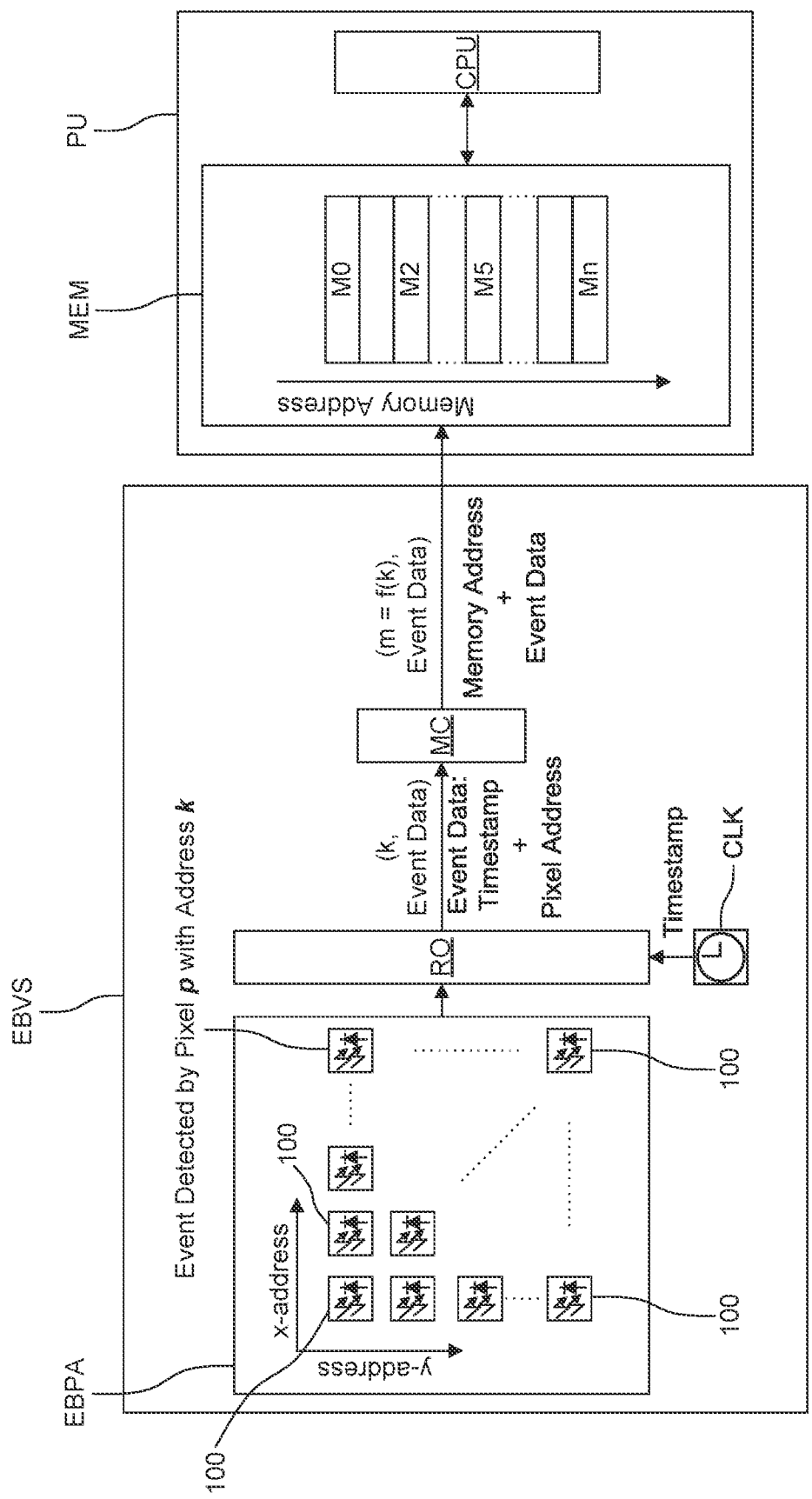
FIG. 3: Event-based image sensor according to an embodiment of the present invention.

FIG. 3 shows a sensor which has been constructed according to the principles of the present invention.

The sensor EBVS proposed here includes an Event-Based Pixel Array EBPA and read-out circuitry RO. The pixels can be as described in connection with FIG. 10, below. A memory control unit MC receives the event-related data from the read-out circuit RO, and writes it directly to a memory MEM of the processing unit PU, without the need for an external device to operate the memory.

Given the nature of the typical event-based data stream, this approach is especially convenient and offers many advantages. The data stream of events is typically sparse, in the sense that its data-rate depends on the scene that is captured by the pixel array (as opposed to a frame-based data stream, where the data-rate is fixed and independent of the scene). This means that relieving the processing unit from data reception and storage, makes the elaboration speed less dependent on the observed scene. Furthermore, every single piece of event-related information is typically small, and can be stored in a small portion of a memory; this means that the overhead for the memory address calculation can be big, compared to the amount of data to store, and can then considerably increase the workload for the processing unit.

Thus, in a state-of-the-art implementation such as shown in FIG. 1 or 2, the load of the processing unit depends on the data-rate of the output of the pixel-array, meaning that the System Latency heavily depends on the specific scene that is observed.

A main advantage of the proposed invention comes from the fact that often the event-based data stream includes addresses of those pixels that detected an event, and optionally some further information on that pixel. Handling the memory interface on the sensor allows for a further compression of the data: the memory controller MC can relate for each event the address in the memory to the address of the pixel that generated it in the pixel array. This 'mapping' approach allows to topologically map each pixel 100 of the pixel array EBPA into the memory MEM which itself is an array of memory elements. Such a mapping step is frequently part of a data elaboration pipeline in event-based vision systems, and with this invention it could be efficiently implemented directly in the sensor.

In more detail, each pixel 100 in the array EBPA has a unique address k. The read-out circuit reads the event (or event-related data) from the pixel and sends it to the memory controller MC, together with the address k of the pixel p. The memory controller ensures that the memory address m where that event data is written to, is a function of the address k of the pixel p the event is originating from. Typically, there is a one-to-one unique mapping between each pixel 100 of the array EBPA and memory location m or addresses of the memory MEM.

This can be expressed by a formula:

$m = f(k).$

Figure 4:
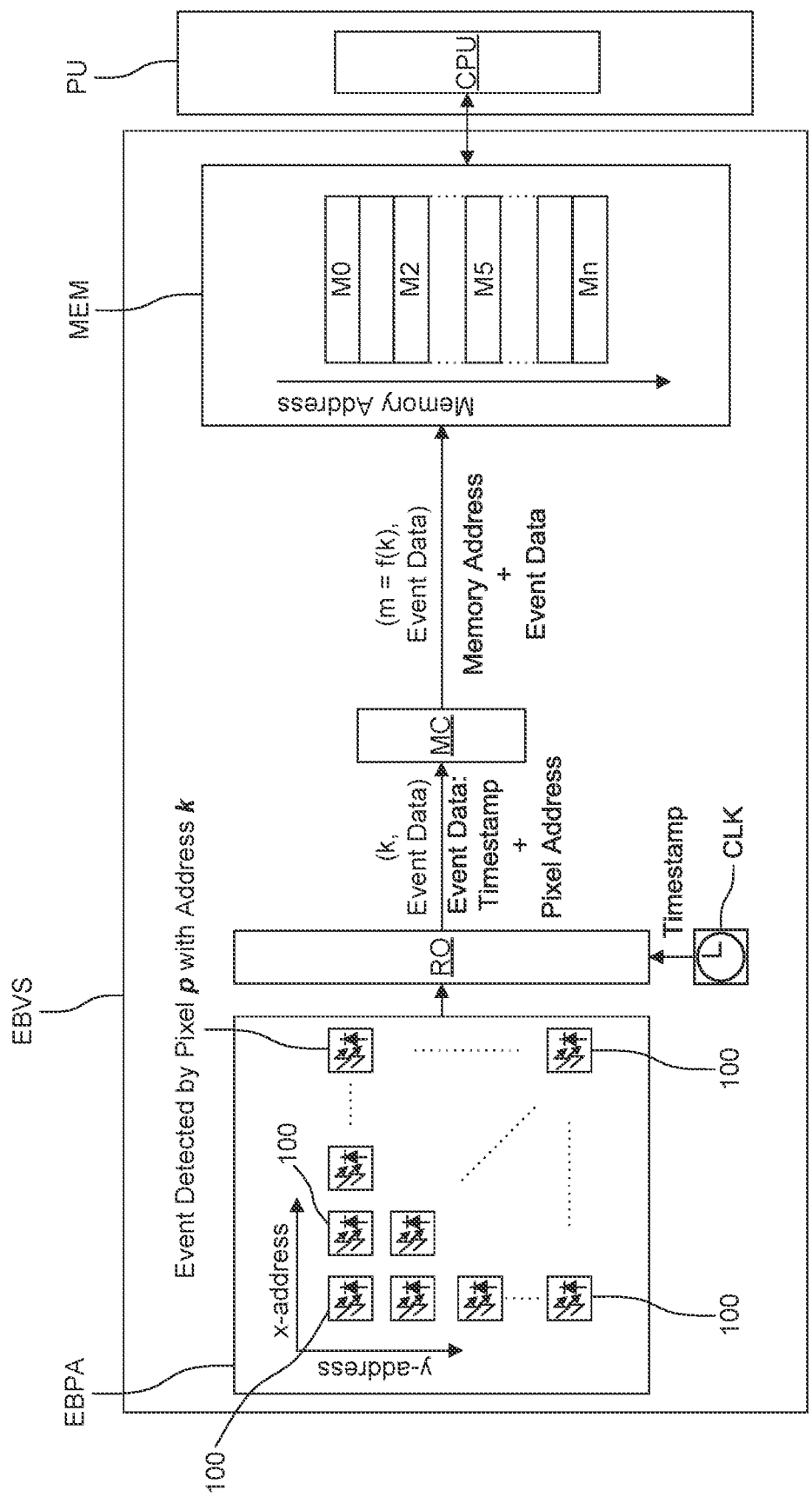
FIG. 4: Another embodiment for the proposed invention: the sensor also includes the memory for saving the event data, which can be accessed by any external data processing pipeline.

The embodiment shown in FIG. 4 is similar to the one in FIG. 3, but the sensor EBVS also includes on-board memory MEM. This is to further optimize the System Latency and to allow for advanced wafer stacking implementation of the sensor (see FIGS. 8A and 8B). The memory MEM on the sensor EBVS must be able to be written by the memory controller MC, which sits in the sensor EBVS as well, and be accessed for reading by an external device.

In one embodiment, the memory MEM is on-board in the sense that the memory is located on the same silicon chip or die as the array EBPA. Nevertheless, the key point is that the sensing device and the memory are directly connected, with a dedicated communication interface, such that the output of the sensor is the output of the memory.

On the other hand, in some cases it would be preferable to realize the pixel array and the memory in two separate pieces of silicon or chips, each fabricated in the best technology for their purpose, but then connected directly, such that the output of this system (=this sensor) that has to be processed by the PU is the output of the memory. These two silicon chips would preferably be located in the same package (3D IC or SIP, for example).

Also shown is a clock source CLK. The clock source provides the timestamps of the events. In general, it can be internal or external to the sensor EBVS.

Figure 5A:
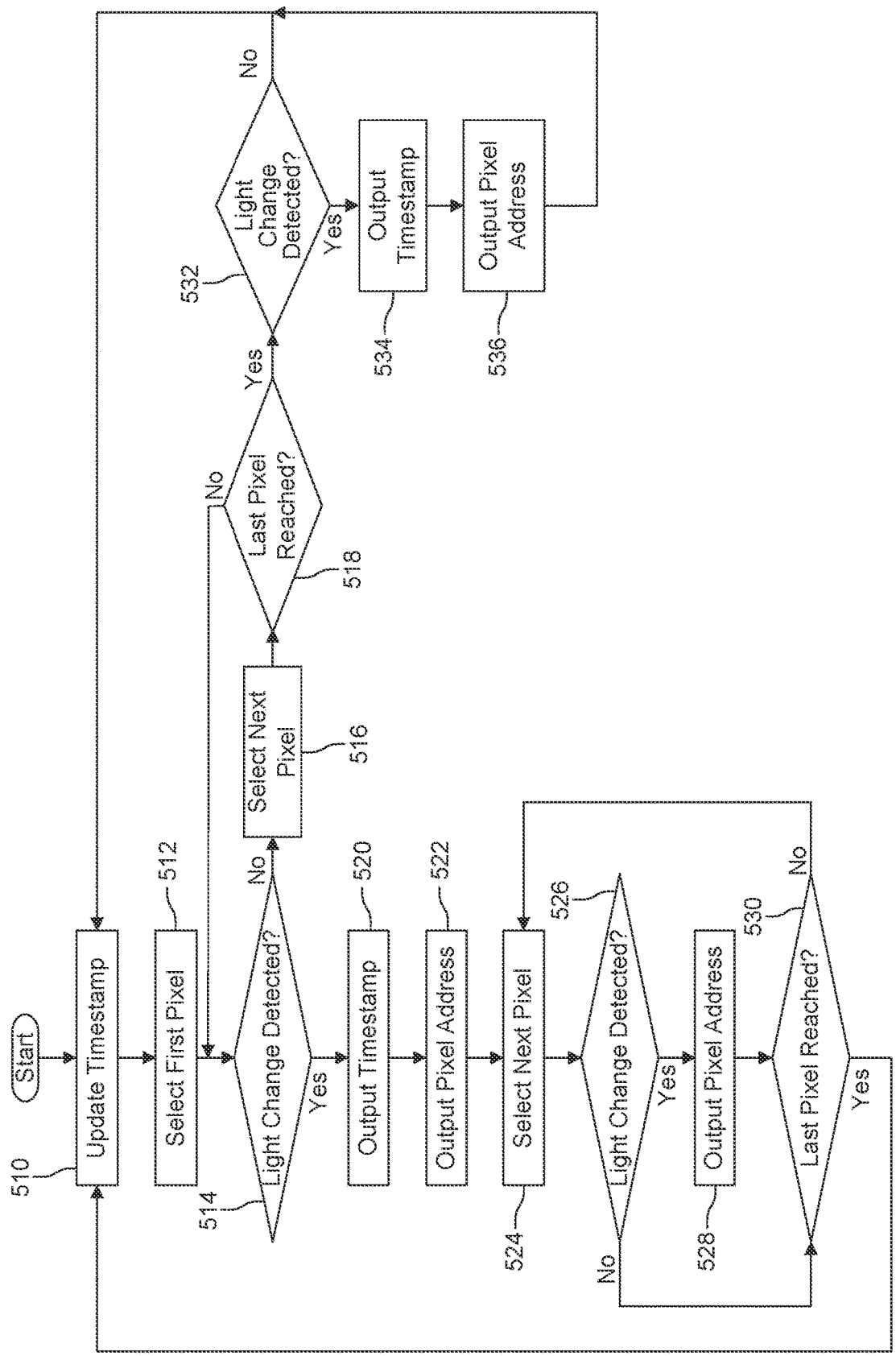
FIG. 5A is a flow diagram representing the operation of the read-out circuitry in the sensor.

FIG. 5A is a flow diagram showing one implementation of the operation of the read-out circuit RO.

In more detail, the read-out circuit RO reads the events from the pixel array by scanning cyclically through the pixel array, to detect if any of the pixels generated an event since the last time it was checked in steps 512, 514, 516, and 518. At the beginning of this scanning cycle, the read-out circuit reads the timestamp and stores it until the next scanning cycle in step 510. Then it scans through the pixel array, detecting which of the pixels generated an event since the previous scanning cycle (i.e. since the previous timestamp was read). If at least one of the pixel generated an event as determined in step 514, then the read-out circuit outputs towards the memory controller the timestamp in step 520, followed by all the addresses (in the form of x,y coordinates) in steps 522, 524, 526, 528, and 530 of the pixels that generated an event. Each of these information items (either timestamps or pixel addresses) is a package of event data. The stream of packages output by the read-out circuit in this way, includes a list of timestamps, interleaved by the addresses of the pixel (i.e. the position of the pixels in the array) that generated events between two consecutive timestamps.

A different implementation of a read-out circuit such as described in U.S. Pat. No. 7,728,269B2 uses asynchronous pixels that can initiate the communication, and the read-out circuit takes care of arbitrating between simultaneously requesting pixels and sending out the addresses of the requesting pixels sequentially.

Figure 5B:
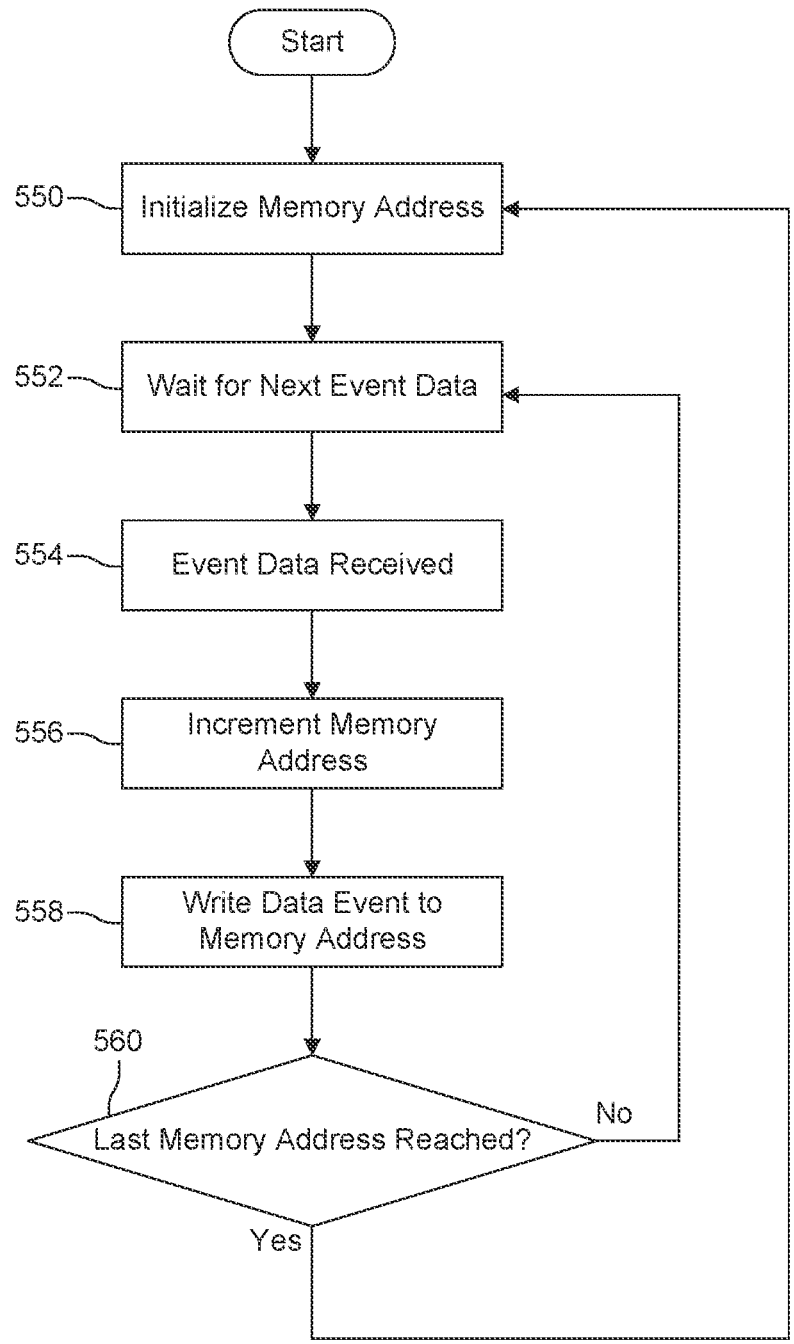
FIG. 5B is a flow diagram that represents the operation of the memory controller in the sensor.

FIG. 5B is a flow diagram showing one implementation of the operation of the memory controller MC. It has the task of sequentially writing these packages to the memory MEM; for example, in a ring buffer structure:

In more detail, a memory address is initialized in step 550 and the memory controller MC waits for the next event data in step 552.

Then, every time a package is received in step 554, the memory address is incremented in step 556 by one and the package becomes the content of the location in the memory that has that address in step 558. Whenever the memory address m reaches the maximum index of the allocated memory space, it is wrapped to the smallest address of the allocated memory space to thereby implement the ring buffer.

The memory MEM is then accessed in read-mode by another device, for instance a processing unit PU like a DSP, that can readily perform its elaboration on event data already received from the pixel array and saved to the memory. For this purpose, it is necessary for the read-only process to have access to the current memory address k, also known as write pointer.

In general, this elaboration by the processing unit includes collecting the information detected by a sensor, i.e., about the light that hit the sensor, and performing calculation or manipulation on it in order to extract further information, not directly captured by the sensor, but available after this elaboration. In one specific example, the elaboration involves estimating a distance between two objects or the speed of an object or recognition of an object based on information collected by the light hitting an image sensor.

FIG. 6A shows the implementation of a memory map TM for the memory MEM, called last-timestamp map. It is a type of operation normally and frequently done during data elaboration, which can be performed directly by the sensor EBVS, using the proposed invention.

The specific feature of this implementation is in the way the memory controller MC is operated. The memory address m where a certain event-related data package is saved, is a function of the address k (i.e. the geometrical position in the array) of the pixel that generated that event, to which the data package refers.

The clock source CLK that provides the timestamps of the events can be internal or external to the sensor EBVS.

The read-out circuit RO, in this case, only takes care of continuously collecting from the pixel array EBPA the addresses of those pixels that generate an event, and outputting them (in the form of x,y coordinates).

Figure 6B:
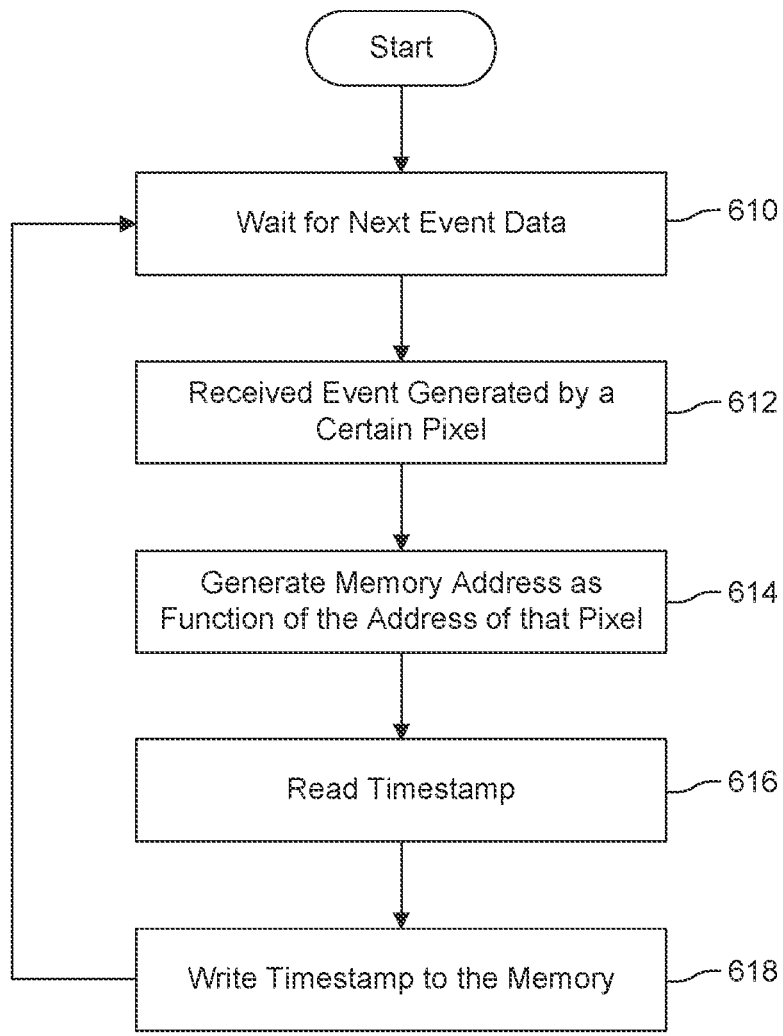
FIG. 6B: Flow diagram that represents the operation of the memory controller in the sensor presented in FIG. 6A (the read-out circuitry can be any of the typically used ones in an event-based application, producing an event address stream).

As shown in the flow diagram of FIG. 6B, in a first step, the memory controller MC will wait for the next event data in step 610 and then receive that event data in step 612 from the readout RO. In steps 614 and 616, the memory controller MC assigns a timestamp derived from the clock source CLK to every address received from the readout circuit RO. Then it calculates the memory address m to which that timestamp will be written, as a function of the pixel address k (i.e. of the position in the array) to which that timestamp has been associated, upon receiving said address from the read-out circuit. Finally, in step 618, the memory controller MC will write the timestamp to the determined memory address.

In this way, each pixel address in the EBPA has a well-defined address in the memory MEM such that the most recent timestamp of any pixel is mapped to the array. For this reason, the map of the pixel array that the memory controller MC maintains in the memory is called last-timestamp map.

The memory MEM may be implemented in a way that allows an external elaboration device, such as a DSP or a CPU, to access it for reading, independently from the writing performed by the memory controller (e.g. dual-access memory). The processing unit can perform elaboration on the last-timestamp map, without taking care of maintaining the map in the first place.

In the specific case of a last-timestamp map, the function that relates the memory address to the pixel address is preferably biunivocal (every address in the memory MEM is associated with one and only one pixel of the event base pixel array EBPA), but other types of mappings are possible, where this function may not be biunivocal, e.g. if a certain area of the pixel array is to be mapped to a single address or a set of addresses.

Figure 6C:
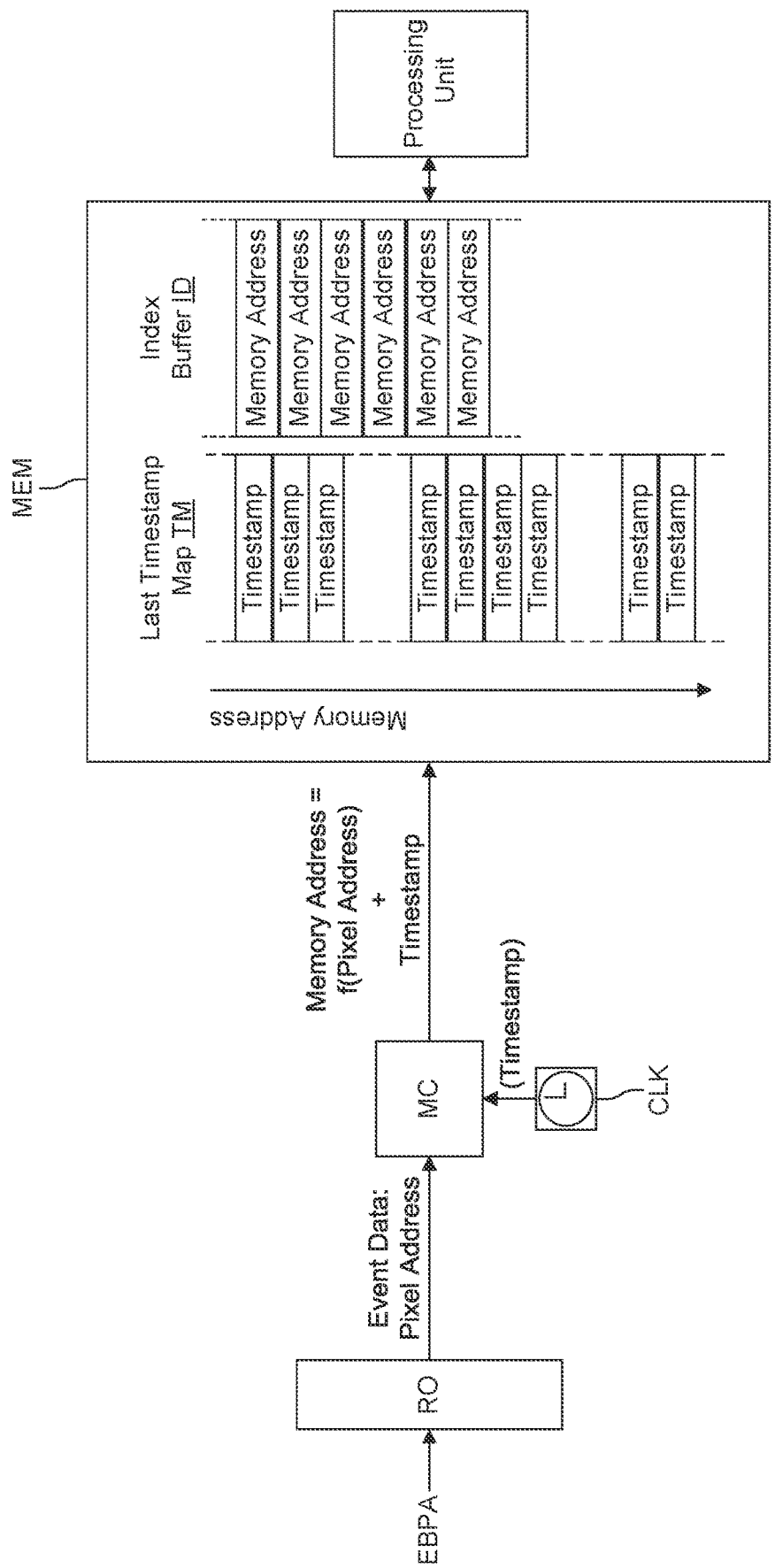
FIG. 6C: Enhanced version of the embodiment in FIG. 6A, where a memory index buffer is added.

In FIG. 6C, it is shown an enhanced version of the embodiment in FIG. 6A. An index buffer ID is added with the function of maintaining information about the parts of the map TM that have changed since the last time the processing unit PU has read from it.

This function may be implemented using a ring-buffer type as memory index buffer. Every time a timestamp is updated in the last timestamp map TM, the memory address of the location where that timestamp has been written is added to the index buffer ID.

Figure 6D:
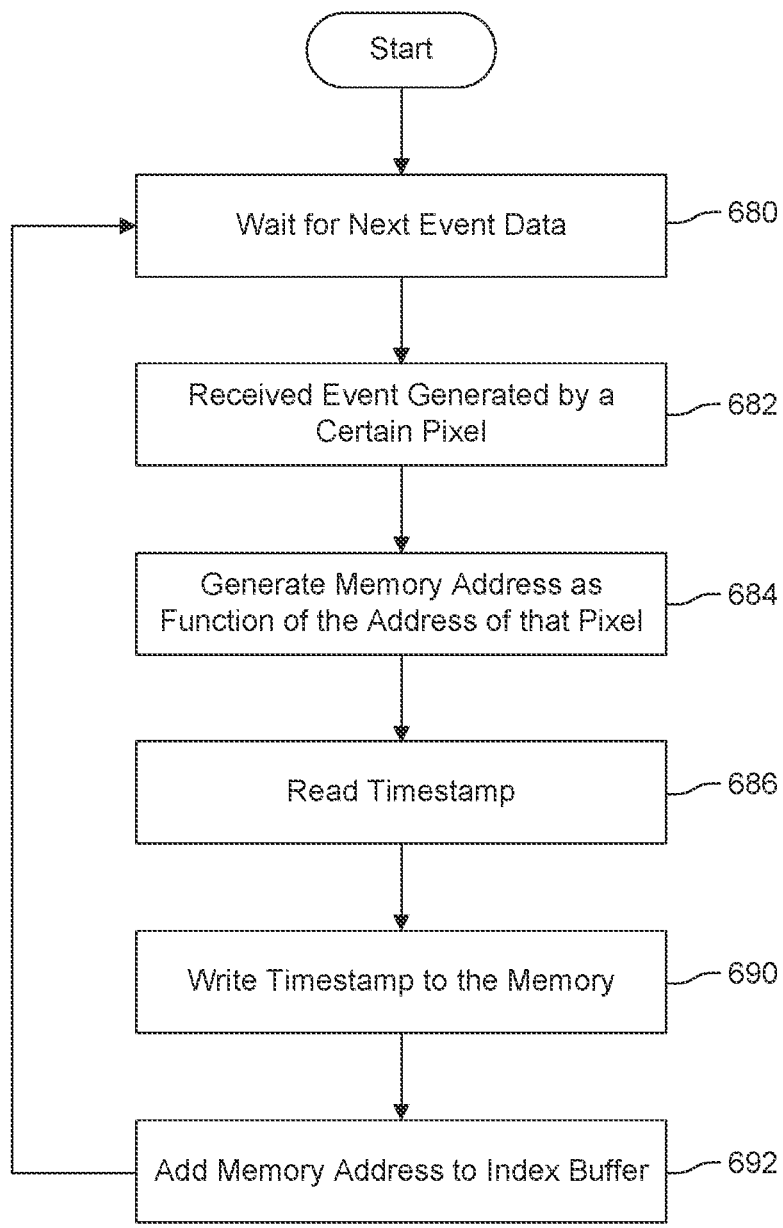
FIG. 6D: Flow diagram showing the operation of the memory controller in the sensor presented in FIG. 6C.

As shown in the flow diagram of FIG. 6D, the memory controller MC will wait for the next event data in step 680 and then receive that event data in step 682 from the readout RO. The memory controller MC assigns a timestamp read from the clock source CLK (step 686) to every address received from the readout circuit RO. Then it calculates the memory address m to which that timestamp will be written in step 684, as a function of the pixel address k (i.e. of the position in the array) to which that timestamp has been associated, upon receiving the address from the read-out circuit. In step 690, the memory controller MC will write the timestamp to the determined memory address in the timestamp map TM. Finally, in step the memory controller MC adds the memory address to the index buffer D3.

The processing unit PU, on the other hand, will read from this buffer ID the memory addresses that have to be read to get the latest timestamps, updating a read pointer in this index buffer ID to the last memory address that has been read. So, elaboration can be performed, while the sensor updates the last timestamp map and the index buffer. Then when the processing unit PU is ready to extract more data from the map, can start reading from the index buffer the memory addresses that it needs to read from the map TM since last time it updated the read pointer, which are only the ones that have changed. In this way the processing unit PU can speed up the reading of the map, by quickly accessing the areas of the map TM that have changed since last time some data was extracted from it, without the need of reading through the whole map every time.

Figure 7:
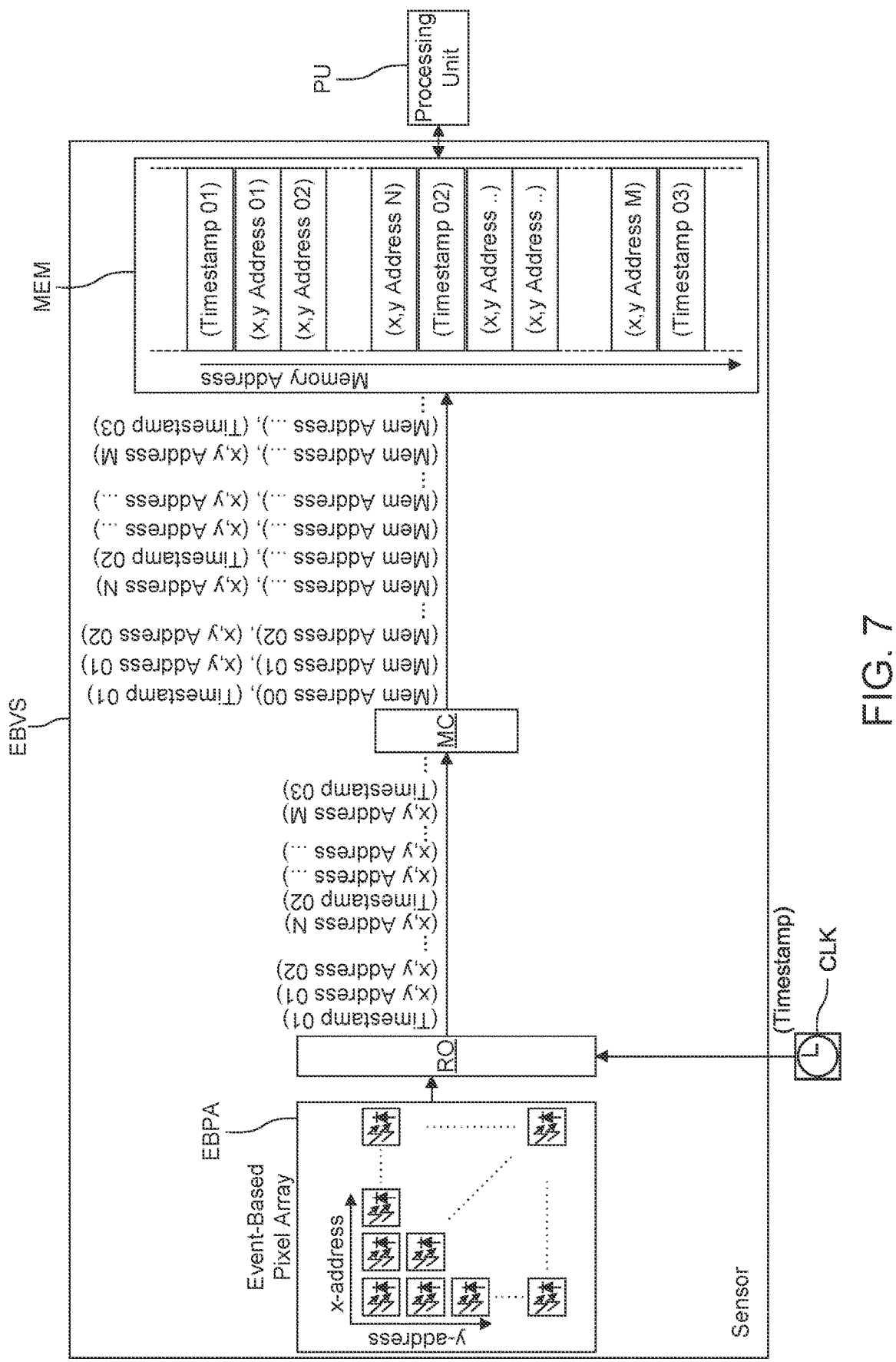
FIG. 7: Embodiment with FIFO memory integrated on the sensor.

In FIG. 7 is presented an embodiment of the invention where the memory is located in the sensor EBVS as well, preferably in the same IC or chip. The pixel array EBPA has change-detection pixels 100, each of which can generate an event if a change in the light that hits it is detected. The read-out circuit RO scans cyclically through the array EBPA, to detect if any of the pixels detected a light change since the last time it was checked (i.e. at the previous scan cycle). At the beginning of each scanning cycle, the timestamp is read from the clock source CLK and stored.

As it has been mentioned also above, other implementations of the read-out circuit could be used. For example, so called asynchronous read-out methods could be used, in which the pixels are initiating the communication when an event data is ready to be transmitted.

If a light change is detected in at least one of the pixels, then the timestamp read at the beginning of the array read-out cycle is transmitted, followed by the addresses of all the pixels that detected a light change. Then, a new timestamp is read and the array is scanned again, and so on. In this particular implementation, the clock source CLK is external to the sensor.

The memory controller MC receives the stream of event data packages (timestamps and addresses) and writes them sequentially to the memory MEM. The memory address is incremented by one every time either a timestamp or a pixel address is received. An address in the memory can store either a timestamp value or a pixel address value.

As it is also the case in FIG. 5A, the memory written in this way, contains a list of timestamps, interleaved by the addresses (i.e. the positions in the array) of the pixels that generated events between two consecutive timestamps.

The memory MEM is preferably internal to the sensor EBVS and can be accessed in read-mode by an external processing unit PU, independently from the writing operations of the memory controller MC. In this specific case, the memory is preferably a dual-access or dual port FIFO. A FIFO (acronym for "first in, first out") is a type of memory implementation where the first data package to be written is the first to be read, and the subsequent reading operations will get the least recently written data packages first. It can be seen as a list, where the writing operations append data packages to the tail, while the reading operations get data packages from the head, moving the head to the next data package after one is read. Specifically, the write pointer, which defines the address in the memory in which the next data package will be written, is incremented every time a new package is to be saved; the read pointer, which defines the address from which the next package is to be read, is also incremented every time a package is read. Since this memory is dual-access, the read-pointer is incremented by the external device that reads the data, while the write pointer is incremented by the memory controller.

Specific Application Examples: 3D IC

FIG. 8A shows an example of an implementation of the proposed invention in a 3D IC (three-dimensional integrated circuit) process. A three-dimensional integrated circuit is an integrated circuit realized by vertically stacking wafers or dies and interconnecting them vertically, using for example through-silicon vias or soldering together the bonding pads, e.g. with Cu-Cu connections. The advantages of this approach are many; among others: smaller area occupation; reduced interconnection length, which in turn allows for bandwidth improvement and power reduction; heterogeneous integration of different technology processes in a single device; specifically for light receptor type of application, one of the main advantages is the maximization of the quantum efficiency (QE), by the maximization of the fill-factor (percentage of the area of the pixel occupied by the light sensitive device), which is possible thanks to the use of back-side illumination (BSI), for example.

In FIG. 8A, an example of 3D stacked process is shown, where two dies are vertically stacked and bonded together. A portion of a vertical section of the stacked wafers (before cutting them into dies) is represented. The through-silicon vias can be used to give access to the bottom wafer to the external connections. The top wafer is flipped vertically, so that its substrate is on top and its back-end of line faces the back-end of line of the bottom wafer, which has the substrate towards the bottom. The bonding pads of the two wafers can then be directly bonded together using Cu-Cu connections. In this representation, the top wafer has additional layers of metal for interconnections and bonding pads manufactured on its substrate side.

The top wafer includes the photo-sensitive devices, which are supposed to be implemented as photo-diodes that receive the light from the back of the wafer (BSI process: back-side illumination), the pixel circuitry to bias and operate the photo-diodes, the read-out circuit and the memory controller; the bottom wafer includes the memory on a dedicated die. Most likely, the wafer containing the memory dies is manufactured in a different process than the one containing the photo-sensitive devices, since these two types of electronic devices have typically different technology requirements.

The device resulting from this process is an integrated circuit, made of more than a single die, all of these dies being stacked and interconnected vertically.

Figure 8B:
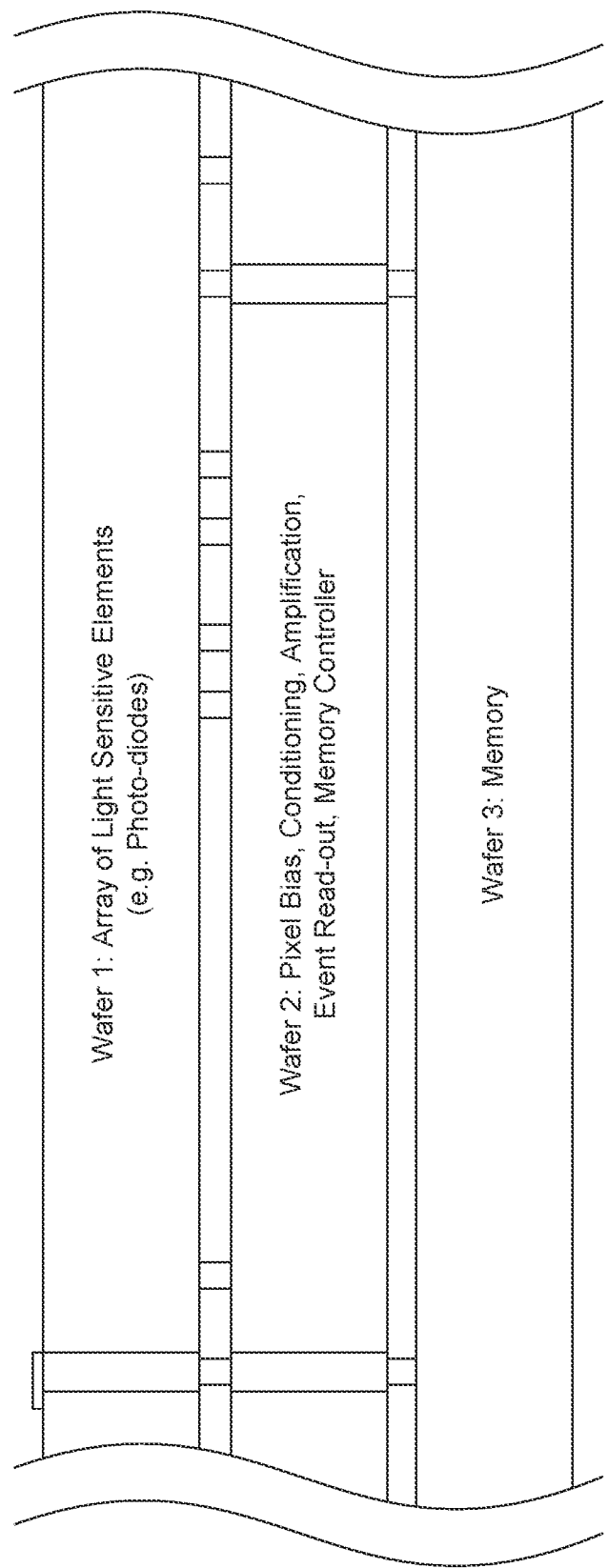
FIG. 8B: Another embodiment showing a three-dimensional integrated circuit implementation: three wafers (or dies) are stacked together; a vertical section of a portion of the stacked wafers is shown. One is just for the photo-diodes; the middle one implements the circuitry needed to operate the photo-diodes, the read-out circuit and the memory controller; the bottom one is a memory integrated circuit.

In FIG. 8B, another example of 3D IC to implement the proposed invention is shown. Here, the stacking process puts together three separated wafers (or dies). The top wafer, which has the substrate towards the top, just includes back-side illuminated photo-diodes, bonding pads on the substrate side and through-silicon vias to expose the bottom wafers to the external connections. The middle wafer, which has the substrate towards the bottom, includes the pixel circuitry to bias and operate the photo-diodes, the read-out circuit and the memory controller. The bottom wafer, as in the example of FIG. 8A, includes the memory on a dedicated die, and it's connected to the top wafer and to the external using through-silicon vias.

Application in Conventional Architectures

Figure 9:
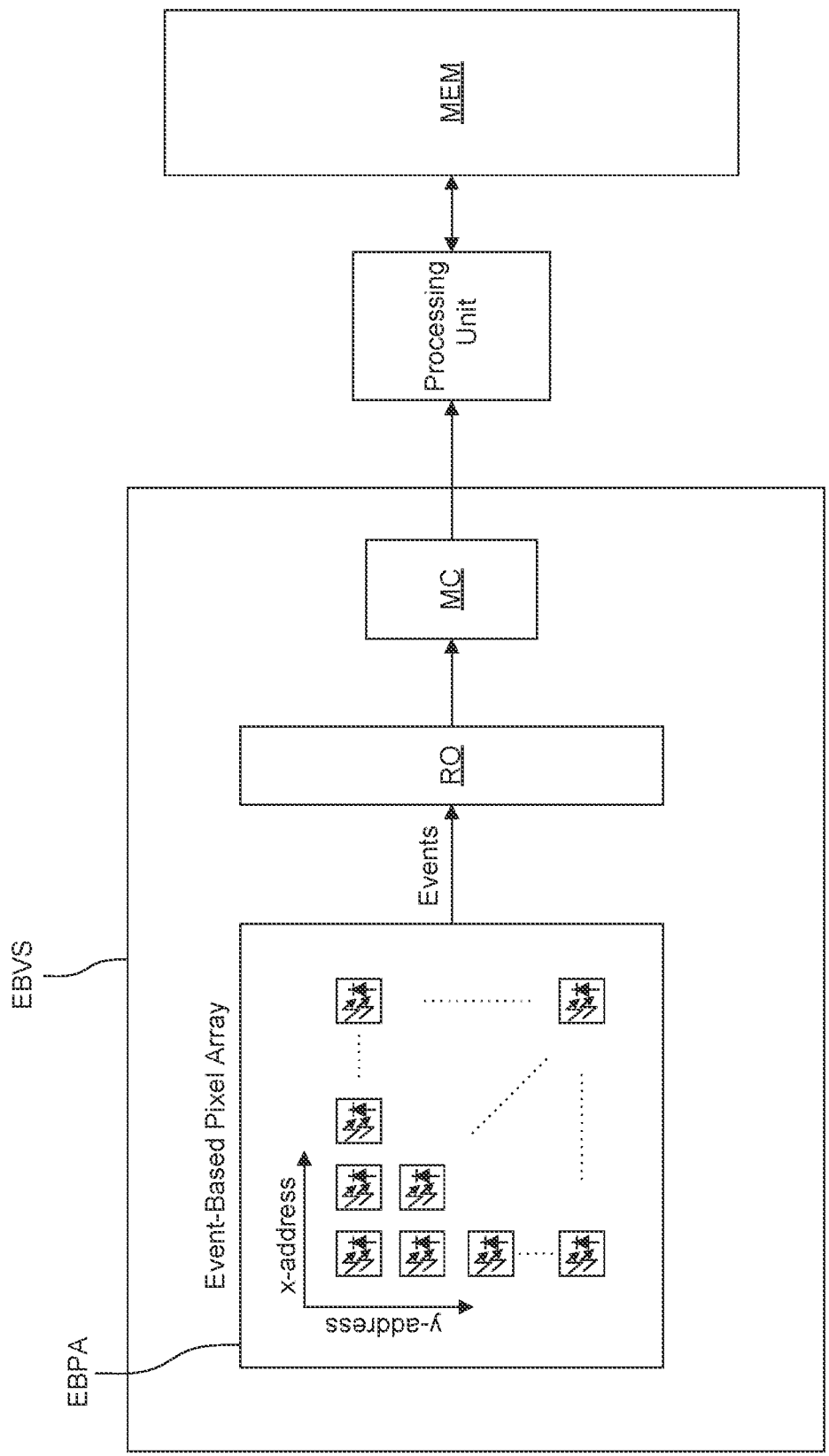
FIG. 9: Embodiment showing an application of the proposed invention in a 'conventional' architecture: the benefit in terms of latency, in this case, would be given by the fact that the processing unit would not have to perform the calculation needed to translate the event data and pixel addresses into memory addresses and values.

FIG. 9 shows an embodiment where the memory controller MC is integrated in the sensor and cannot directly write to the memory MEM, instead the data has to pass through the processing unit PU. Even in such an embodiment, the invention has advantages. Specifically, even if the processing unit PU would have to write the data to the memory, it would not have to perform the calculation to determine the memory address to which a data package must be written. This is especially convenient in mapping applications. Typically, when event-related data is to be mapped to the memory according to the position of the pixels, some mathematical operations have to be performed. For example, in the case that the pixel address is given as two numbers, one representing the x position and one the y position, a multiplication and a sum have to be performed to calculate the memory address. If this is already performed in the sensor, the processing unit would just have to write the data package to the address that it receives, eventually adding an offset if the starting address in the memory has to be adjusted, but without the need to perform the multiplication.

Figure 10:
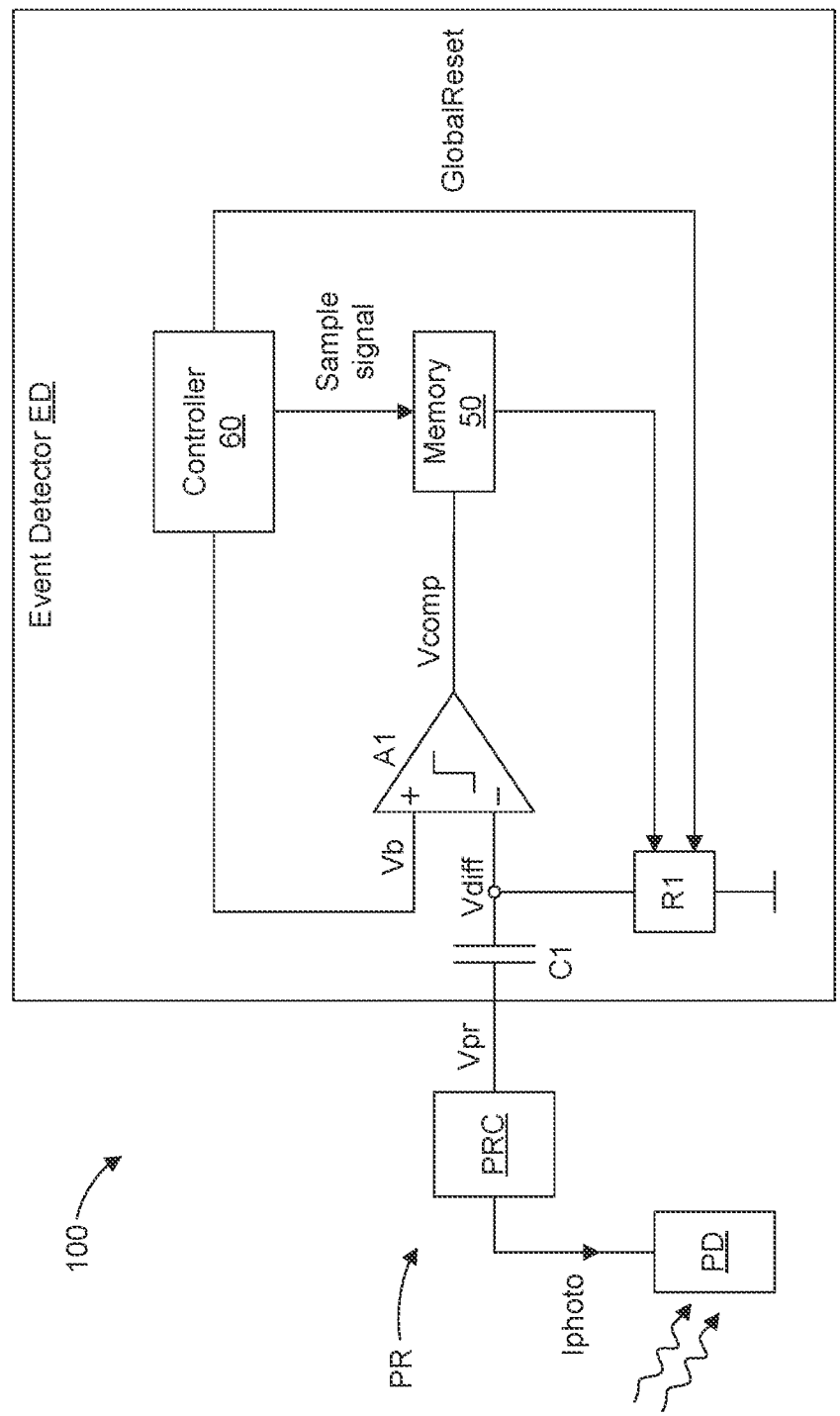
FIG. 10: Circuit diagram showing a state of the art (SOA) pixel implementation for an event-based image sensor, e.g. according to PCT/IB2017/058526 and U.S. Pub. No. 2018/0191972.

FIG. 10 shows an example of a pixel of the EBPA of an EBVS in the above described system. It is taken from PCT/IB2017/058526 and U.S. Pub. No. 2018/0191972, which is incorporated herein by this reference in its entirety. However, the core concepts in the proposed invention can be applied to virtually any Event-Based Vision Sensor realized as IC, not depending on any specific pixel architecture used.

The major components of a pixel circuit are enumerated below.

1. Photoreceptor module. As shown in the figure, the pixel circuit 100 contains a photodiode PD, or other photosensor, to measure impinging light 9 and convert the light intensity to current Iphoto; a photoreceptor circuit PRC to generate a photoreceptor signal Vpr dependent on the light intensity; and a memory capacitor C1 to remember past photoreceptor signal. The photosensor PD and photoreceptor circuit PRC constitute the photoreceptor module PR.

2. Memory capacitor C1: Receives the photoreceptor signal Vpr such that first plate of the capacitor carries a charge that is responsive to the photoreceptor signal Vpr and thus the light received by the photosensor PD and is part of the event detector ED. A second plate of the memory capacitor C1 is connected to the comparator node (inverting input) of A1. Thus the voltage of the comparator node, Vdiff, varies with changes in the photoreceptor signal Vpr.

3. Comparator A1: This is a means to compare the difference between current photoreceptor signal Vpr and past photoreceptor signal to a threshold and is part of the event detector ED. This comparator A1 can be in each pixel, or shared between a subset (for example a column) of pixels. In the preferred embodiment the comparator will be integral to the pixel, with each pixel having a dedicated comparator A1.

4. Pixel memory: Pixel memory 50 stores the comparator output based on a sample signal from the controller 60 and is part of the event detector ED. Memory can be a sampling circuit (for example a switch and a parasitic or explicit capacitor) or a digital memory circuit (a latch or a flip-flop). In one embodiment, the memory will be a sampling circuit and each pixel will have two memories.

5. A conditional reset circuit R1: Condition for reset is a combination of the state of the memorized comparator output and a reset signal applied by the controller 60 and is part of the event detector ED.

6. Peripheral circuit components: The comparator A1 and the memory 50 can be located in the pixel or in peripheral circuits (outside the pixel circuit).

The peripheral circuits contain a controller 60 which applies threshold signals to the comparator A1, sends control signals to memory 50 and selects times when the conditional reset circuit R1 becomes active.

The peripheral circuits may also contain the readout circuit, which reads the content of the memory 50, determines if the light intensity for a given pixel has increased, decreased, or unchanged, and sends the output (computed from the current memory value) to a processor.

In more detail, the comparator tells if light has increased/decreased. For Off event: if Vdiff is lower than the threshold Voff (on Vb), the comparator output is high, and this level is stored in the memory. This means a decrease is detected. If Vdiff is not lower than the threshold, the comparator output is low: no decrease detected.

The only difficulty is that for On event, a low comparator output means an increase, while high means no change; but for Off event high comparator output means decrease while low means no change.

So the readout must know the memory content and which threshold was applied.

The pixel circuit 100 and controller 60 operate as follows.

A change in light intensity received by the photosensor PD will translate to a change in photoreceptor signal Vpr. When the reset circuit R1 is not conducting, the changes in Vpr will be reflected also in the voltage Vdiff at a comparator node at the inverting input (−) to the comparator A1. This occurs because the voltage across the memory capacitor C1 stays constant.

At times selected by the controller 60, the comparator A1 compares the voltage at the comparator node at the second terminal of the memory capacitor C1 (Vdiff) to a threshold voltage Vb (from controller) applied to the non-inverting input (+) of the comparator A1.

The controller 60 operates the pixel memory 50 to store the comparator output Vcomp. The memory 50 is typically implemented as part of the pixel circuit 100 as shown. In other embodiments, however, the memory 50 is implemented as part of column logic circuit (peripheral circuit, one per each column of the pixel array).

If the state of the stored comparator output held in the memory 50 indicates a change in light intensity AND the global reset signal GlobalReset signal from the controller 60 is active, the conditional reset circuit R1 is conducting. Here "AND" indicates the logical AND operator. With the conditional reset circuit R1 in a conductive state, the voltage at the comparator node at the inverting input of the comparator A1 (Vdiff) is reset to a known level. Thus, it stores the current photoreceptor signal Vpr on the memory capacitor C1.

While this invention has been particularly shown and described with references to preferred embodiments thereof, it will be understood by those skilled in the art that various changes in form and details may be made therein without departing from the scope of the invention encompassed by the appended claims.

What is claimed is:

1. An event-based vision sensor system, comprising:
   an event-based pixel array comprising pixels that detect light;
   a readout circuit for reading out events associated with light received by each pixel and with the position it occupies in the array; and
   a memory controller that enables writing of each event, including a timestamp and an address of any pixel that detected a change, to a certain address in a memory and providing one-to-one mapping between pixels of the event-based pixel array and addresses in the memory; wherein the memory controller is on the same chip as the event-based pixel array.

2. The system as claimed in claim 1, wherein the memory controller that ensures that the position of that address in the memory in which that event or event-related data is written, is a function of the position in the pixel array occupied by the pixel that generated that event.

3. The system as claimed in claim 1, wherein the memory can be written by the memory controller and independently read from outside.

4. The system as claimed in claim 1, which is implemented as three-dimensional integrated circuit.

5. The system as claimed in claim 1, wherein the memory controller assigns each pixel a dedicated address or range of addresses of the memory and wherein the memory address dedicated to a certain pixel is a function of a location of that certain pixel in the array.

6. The system as claimed in claim 1, wherein the memory controller stores timestamps in the memory.

7. The system as claimed in claim 1, wherein the memory controller maintains a buffer index in the memory for last time stamp map also stored in the memory.

8. A method of operation of an event-based vision sensor system, comprising:
   detecting light with an event-based pixel array;
   reading out events associated with light received by each pixel and with the position it occupies in the array with a readout circuit; and
   a memory controller writing of each event, including a timestamp and an address of any pixel that detected a change, to different address in a memory and providing one-to-one mapping between pixels of the event-based pixel array and addresses in the memory, wherein the memory controller is on the same chip as the event-based pixel array.

9. The method as claimed in claim 8, further comprising the memory controller ensuring that the position of that address in the memory in which that event or event-related data is written, is a function of the position in the pixel array occupied by the pixel that generated that event.

10. The method as claimed in claim 8, wherein the memory can be written by the memory controller and independently read from outside.

11. The A method as claimed in claim 8, which is implemented as three-dimensional integrated circuit.

12. The method as claimed in claim 8, further comprising the memory controller assigning each pixel a dedicated memory address of the memory and wherein the memory address or range of addresses dedicated to a certain pixel is a function of a location of that certain pixel in the array.

13. The method as claimed in claim 8, further comprising the memory controller storing timestamps in the memory.

14. The method as claimed in claim 8, further comprising the memory controller maintaining a buffer index in the memory for last time stamp map also stored in the memory.

15. An event-based vision sensor system, comprising:
   an event-based pixel array comprising pixels that detect light;

a readout circuit for reading out events associated with light received by each pixel and with the position it occupies in the array; and a memory controller, on the same chip as the event-based pixel array, that enables writing of each event to a certain address in a memory, wherein the memory controller assigns each pixel a dedicated address of the memory and wherein the memory address or range of addresses dedicated to a certain pixel.

16. The system as claimed in claim 15, wherein the event-based pixel array is implemented in a first die and the memory is implemented in a second die.

17. The system as claimed in claim 16, wherein the dies are bonded together using Cu-Cu connections.

18. The system as claimed in claim 16, further comprising a middle die, between the first die and the second die, wherein the middle die includes pixel circuitry to bias and operate photo-diodes in the first die.

19. The system as claimed in claim 15, wherein the event-based pixel array is a back-side illumination array.

* * * * *